US009233604B2

(12) United States Patent
Yamamoto et al.

(10) Patent No.: US 9,233,604 B2
(45) Date of Patent: Jan. 12, 2016

(54) IN-WHEEL MOTOR DRIVE ASSEMBLY

(75) Inventors: Ken Yamamoto, Iwata (JP); Aiko Ishikawa, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/345,963

(22) PCT Filed: Sep. 3, 2012

(86) PCT No.: PCT/JP2012/072333
§ 371 (c)(1),
(2), (4) Date: Mar. 20, 2014

(87) PCT Pub. No.: WO2013/047094
PCT Pub. Date: Apr. 4, 2013

(65) Prior Publication Data
US 2014/0232175 A1    Aug. 21, 2014

(30) Foreign Application Priority Data

Sep. 27, 2011  (JP) .................................. 2011-210486

(51) Int. Cl.
B60K 7/00        (2006.01)
F16H 57/04       (2010.01)
B60K 17/04       (2006.01)

(52) U.S. Cl.
CPC ............. *B60K 7/0007* (2013.01); *B60K 17/046* (2013.01); *F16H 57/0457* (2013.01);
(Continued)

(58) Field of Classification Search
CPC ............ F16C 33/6637; F16C 33/6666; B60K 7/0007; B60K 7/00; B60K 17/043; B60K 17/046; B60K 2007/0038; B60K 2007/0092; F16H 57/0482; F16H 57/0483; F16H 57/0421; F16H 57/0424
USPC ............ 180/65.51, 65.1, 65.6, 337, 346, 372; 475/159, 160; 310/90, 67 A, 75 C; 184/6.12
See application file for complete search history.

(56) References Cited

U.S. PATENT DOCUMENTS 5,087,229 A * 2/1992 Hewko et al. ................. 475/149
5,111,090 A * 5/1992 Otake et al. ..................... 310/54
(Continued)

FOREIGN PATENT DOCUMENTS

JP    06-017832    1/1994
JP    2001-124157  5/2001
(Continued)

OTHER PUBLICATIONS

Notice of Reasons for Rejection issued on Dec. 2, 2014 in corresponding Japanese application No. 2011-210486 (with English translation).

(Continued)

*Primary Examiner* — James M Dolak
(74) *Attorney, Agent, or Firm* — Wenderoth, Lind & Ponack, L.L.P.

(57) ABSTRACT

An in-wheel motor drive assembly includes a motor case defining a motor chamber and a reduction mechanism chamber provided on one side of and isolated from the motor chamber by a partition wall. An electric motor is mounted in the motor chamber. A planetary gear reduction mechanism is mounted in the reduction mechanism chamber, and reduces the rotation of the electric motor and outputs the reduced rotation to a hub ring. The reduction mechanism is lubricated by lubricating oil stored in the reduction mechanism chamber. A tapered oil guide surface is formed at the center of the inner surface of the partition wall facing the reduction mechanism chamber. The oil guide surface guides lubricating oil splashed up by the rotating reduction mechanism and flowing down along the inner surface of the partition wall, onto the rotor shaft of the electric motor, thereby lubricating bearings mounted on the rotor shaft.

10 Claims, 9 Drawing Sheets

(52) U.S. Cl.
CPC ........ *F16H57/0471* (2013.01); *F16H 57/0476* (2013.01); *F16H 57/0486* (2013.01); *B60K 2007/0038* (2013.01); *B60K 2007/0092* (2013.01); *B60Y 2306/03* (2013.01)

(56) References Cited

U.S. PATENT DOCUMENTS

| | | | | |
|---|---|---|---|---|
| 5,372,213 | A * | 12/1994 | Hasebe et al. | 180/65.6 |
| 6,942,049 | B2 * | 9/2005 | Shimizu | 180/65.6 |
| 7,214,155 | B2 * | 5/2007 | Mueller | B60K 7/0007 |
| | | | | 180/65.51 |
| 7,527,113 | B2 * | 5/2009 | Jenkins | 180/65.51 |
| 8,100,806 | B2 * | 1/2012 | Shibukawa et al. | 475/159 |
| 8,157,036 | B2 * | 4/2012 | Yogo et al. | 180/65.51 |
| 8,251,167 | B2 * | 8/2012 | Moriguchi et al. | 180/65.51 |
| 8,261,866 | B2 * | 9/2012 | Ishida et al. | 180/65.6 |
| 8,360,186 | B2 * | 1/2013 | Yamamoto et al. | 180/65.51 |
| 9,017,198 | B2 * | 4/2015 | Hoebel | F16H 49/001 |
| | | | | 474/139 |
| 9,052,009 | B2 * | 6/2015 | Barillot | F16H 57/0409 |
| | | | | 1/1 |
| 9,077,222 | B2 * | 7/2015 | Makino | B60K 7/0007 |
| | | | | 1/1 |
| 2006/0219449 | A1 * | 10/2006 | Mizutani et al. | 180/65.5 |
| 2011/0011203 | A1 | 1/2011 | Yamamoto et al. | |

FOREIGN PATENT DOCUMENTS

| | | |
|---|---|---|
| JP | 2001-173762 | 6/2001 |
| JP | 2009-079625 | 4/2009 |
| JP | 2009-132252 | 6/2009 |
| JP | 2009-216190 | 9/2009 |
| JP | 2010-025158 | 2/2010 |

OTHER PUBLICATIONS

International Search Report issued Oct. 23, 2012 in International (PCT) Application No. PCT/JP2012/072333.

* cited by examiner

IN-WHEEL MOTOR DRIVE ASSEMBLY

TECHNICAL FIELD

This invention relates to an in-wheel motor drive assembly for driving a drive wheel of a vehicle.

BACKGROUND ART

FIG. 1 schematically shows an in-wheel motor type electric vehicle. The electric vehicle shown has two motor drive assemblies A each including an electric motor as a driving source and mounted, respectively, in the pair of right and left rear wheels 1 as drive wheels such that the rear wheels 1 can be individually driven by the motor drive assemblies A.

Motor drive assemblies A used in such in-wheel motor type electric vehicles include an electric motor, a reduction mechanism for reducing the rotation of the rotor shaft of the electric motor, and a drive axle driven from the reduction mechanism. The rotation of the drive axle is transmitted to one of the rear wheels through a hub ring supported by the drive axle.

Since such a motor drive assembly is mounted in a rear wheel, its axial length has to be sufficiently short. In order to minimize the axial length of such a motor drive assembly, JP Patent Publication 2001-173762A proposes to mount the reduction mechanism inside the rotor of the electric motor.

If a planetary gear mechanism is used as the reduction mechanism, it is necessary to lubricate the reduction mechanism with oil in order to prevent deterioration in durability due to wear of gears and to minimize noise when gears mesh. It is also necessary to lubricate bearings rotatably supporting the rotor shaft with oil in order to prevent seizure of these bearings.

For this reason, in the motor drive assembly disclosed in JP Patent Publication 2001-173762A, oil is stored in the motor case in which the electric motor is mounted to cool the electric motor with the oil and also lubricate the planetary gear type reduction mechanism with the oil. An oil reservoir is provided on the wall of the chamber in which the electric motor is mounted to store oil splashed up by the rotor of the electric motor in the oil reservoir. Oil stored in the oil reservoir is used to lubricate a pair of bearings rotatably supporting the rotor shaft.

In the motor drive assembly disclosed in JP Patent Publication 2001-173762A, since the same oil stored in the motor case is used both to cool the electric motor and to lubricate the reduction mechanism, it is necessary to use oil in such an amount that the lower part of the outer periphery of the rotor is submerged in oil so that oil can be splashed up by the rotor. Since it is necessary to use oil having a high viscosity in order to lubricate the reduction mechanism, the efficiency of the electric motor may deteriorate due to the viscous resistance of oil.

Also, since metal dust generated due to wear of gears of the reduction mechanism is mixed into oil which is used to cool the electric motor, metal dust may enter the electric motor, thus detrimentally affecting the motor.

SUMMARY OF THE INVENTION

An object of the present invention is to provide an in-wheel motor drive assembly of which the reduction mechanism and bearings supporting the rotor shaft can be reliably lubricated with oil.

In order to achieve this object, the present invention provides an in-wheel motor drive assembly comprising a motor case having an end plate portion formed with a cylindrical portion and configured to be supported by a vehicle body, an electric motor including a stator fixedly mounted in the motor case, a rotor mounted in the stator, and a rotor shaft extending along the center axis of the rotor, a reduction mechanism for reducing the rotation of the rotor shaft of the electric motor and outputting the thus reduced rotation, and a hub ring for transmitting the reduced rotation outputted from the reduction mechanism to a drive wheel, wherein the reduction mechanism is a planetary gear mechanism comprising an output shaft arranged coaxial with the rotor shaft, a carrier provided at an end of the output shaft, planetary gears rotatably supported by the carrier, a sun gear mounted on the rotor shaft, and an internal gear fixedly fitted in the inner periphery of the cylindrical portion of the motor case, wherein the planetary gears are in meshing engagement with the sun gear and the internal gear, wherein the reduction mechanism is configured such that when the sun gear rotates, the planetary gears rotate about the axes of the respective planetary gears while revolving around the rotor shaft, thereby rotating the output shaft at a reduced speed, wherein a reduction mechanism chamber is provided outside a motor chamber defined in the motor case so as to be isolated from the motor chamber, wherein the reduction mechanism is mounted in the reduction mechanism chamber, wherein oil for lubricating the reduction mechanism is stored in the reduction mechanism chamber, wherein a partition wall between the motor chamber and the reduction mechanism chamber is formed with a tapered oil guide surface at a central portion of the partition wall, and wherein the tapered oil guide surface is configured to guide oil splashed up by the planetary gears and flowing down along an inner surface of the partition wall while the planetary gears are rotating and revolving, toward a bearing supporting the rotor shaft and the output shaft so as to be rotatable relative to each other.

When the electric motor of this in-wheel motor drive assembly is energized, the rotor shaft rotates, so that the rotation of the sun gear mounted on the rotor shaft is transmitted to the planetary gears, which are in meshing engagement with the sun gear. As a result, the planetary gears rotate about their respective axes while revolving around the rotor shaft, thus reducing the rotation of the rotor shaft and transmitting the thus reduced rotation to the output shaft. The rotation of the output shaft is then transmitted to the drive wheel through the hub ring mounted on the output shaft.

While the drive wheel is being driven in this manner, lubricating oil stored in the reduction mechanism chamber is splashed up and lubricates the planetary gear type reduction mechanism.

The splashed up lubricating oil partially flows down along the inner surface of the partition wall separating the motor chamber from the reduction mechanism chamber, and then flows toward the bearing supporting the rotor shaft and the output shaft so as to be rotatable relative to each other, while being guided by the oil guide surface at the center of the inner surface of the partition wall, thereby lubricating this bearing.

Since the reduction mechanism chamber is isolated from the motor chamber, in which the electric motor is mounted, lubricating oil stored in the reduction mechanism chamber will never detrimentally affect the electric motor.

It is therefore possible to reliably lubricate the bearing without reducing the efficiency of the electric motor.

Radial ribs are preferably formed on the inner surface of the partition wall to increase the strength and thus improve durability, of the partition wall. The radial ribs also serve to collect oil flowing down along the inner surface of the partition wall onto the oil guide surface at the center of the partition wall.

In one arrangement, the carrier includes first and second opposed disk portions sufficiently spaced apart from each other such that the planetary gears can be received between the first and second disk portions, wherein the first disk portion faces the partition wall and is formed with an oil guide passage in the inner peripheral portion of the first disk portion such that oil flowing down along the inner surface of the partition wall partially flows through the oil guide passage and is supplied to bearings rotatably supporting the planetary gears, thereby simultaneously lubricating the bearings supporting the planetary gears too.

In this arrangement, the oil guide passage may comprise an annular groove formed in the outer surface of the first disk portion facing the partition wall at the inner peripheral portion of the first disk portion, the annular groove having an L-shaped section, and through-holes communicating at ends of the respective through-holes with the radially outer edge of the annular groove, and extending toward the end surfaces of the respective bearings rotatably supporting the planetary gears. With this arrangement, the annular groove serves as an oil reservoir. Since the carrier is rotating about the rotor shaft, lubricating oil in the annular groove flows toward the bearings supporting the planetary gears due to centrifugal force. This makes it possible to more efficiently lubricate the bearings supporting the planetary gears.

Preferably, the oil guide surface has its small-diameter end located in the annular groove so that lubricating oil flowing down along the inner surface of the partition wall can more reliably flow into the annular groove.

The in-wheel motor drive assembly according to the present invention preferably further includes first annular spacers and second annular spacers mounted between the first disk portion and the respective planetary gears and between the second disk portion and the respective planetary gears, respectively, such that axial loads applied to the planetary gears are supported by the spacers. This allows smooth rotation of the planetary gears, which results in reduced torque loss.

In this arrangement, a plurality of circumferentially spaced apart cutouts are preferably formed in the inner periphery of the shaft inserting hole of each spacer, through which the gear shaft is inserted. With this arrangement, lubricating oil flowing into the oil guide passage flows into the radially inner spaces of the planetary gears through the cutouts, thus reliably lubricating, with oil, the bearings mounted in the radially inner spaces of the planetary gears and rotatably supporting the planetary gears.

Radial grooves equal in number to the cutouts may be formed in the surface of each of the second spacers facing the corresponding planetary gear so as to communicate with the respective cutouts. With this arrangement, lubricating oil that has lubricated the bearings supporting the planetary gears flows through the radial grooves formed in the second spacers and flows down onto the end of the rotor shaft, so that the bearing supporting the end of the rotor shaft can also be effectively lubricated with oil.

The spacers may be fixed to the planetary gears, or may be supported so as to be rotatable relative to the planetary gears. In the latter case, the shaft inserting holes of the spacers preferably have center axes offset from the centers of radially outer surfaces of the respective spacers. With this arrangement, the point of the circumference of each spacer farthest from the axis of the shaft inserting hole always faces radially outwardly due to centrifugal force during rotation. Thus it is possible to form the cutouts of each spacer such that one of the cutouts is always aligned with the oil guide passage. Thus, lubricating oil can be reliably fed through the cutouts.

According to the present invention, since a reduction mechanism chamber is provided outside a motor chamber defined in the motor case so as to be isolated from the motor chamber, the reduction mechanism is mounted in the reduction mechanism chamber, oil for lubricating the reduction mechanism is stored in the reduction mechanism chamber, a partition wall between the motor chamber and the reduction mechanism chamber is formed with a tapered oil guide surface at a central portion of the partition wall, and the tapered oil guide surface is configured to guide oil splashed up by the planetary gears and flowing down along an inner surface of the partition wall while the planetary gears are rotating and revolving, toward a bearing supporting the rotor shaft and the output shaft so as to be rotatable relative to each other, it is possible to lubricate the reduction mechanism and the bearing with oil without reducing efficiency of the electric motor.

DETAILED DESCRIPTION OF THE INVENTION

Figure 1:
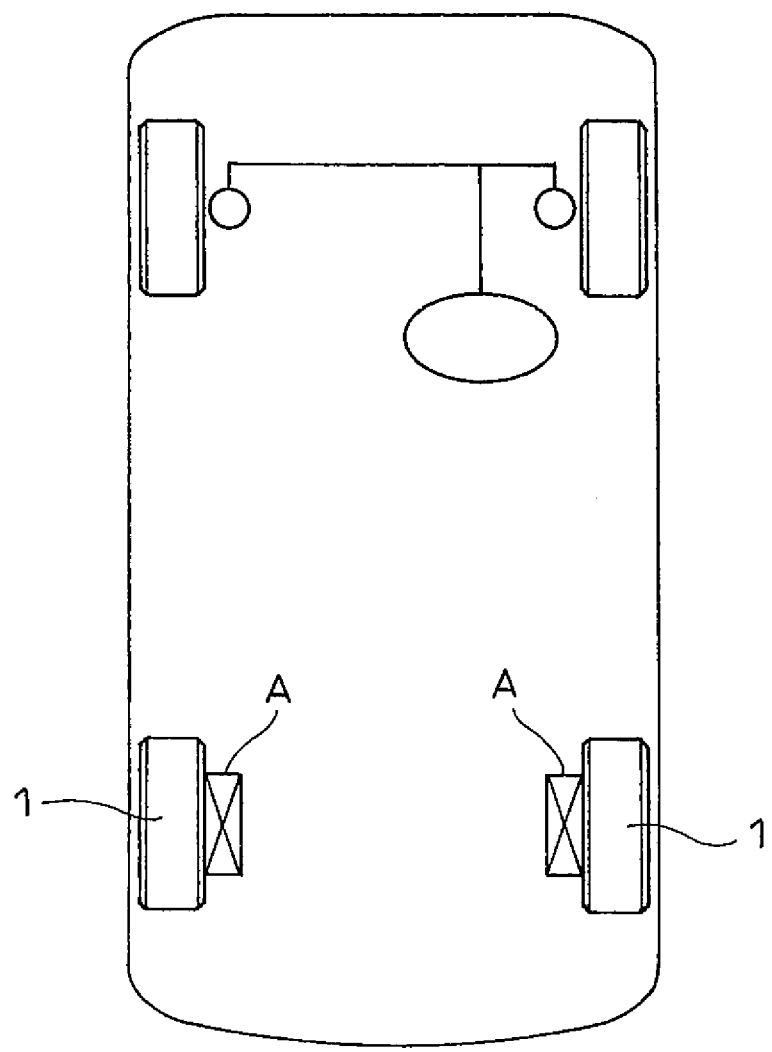
FIG. 1 schematically shows an in-wheel motor type electric vehicle.
Figure 2:
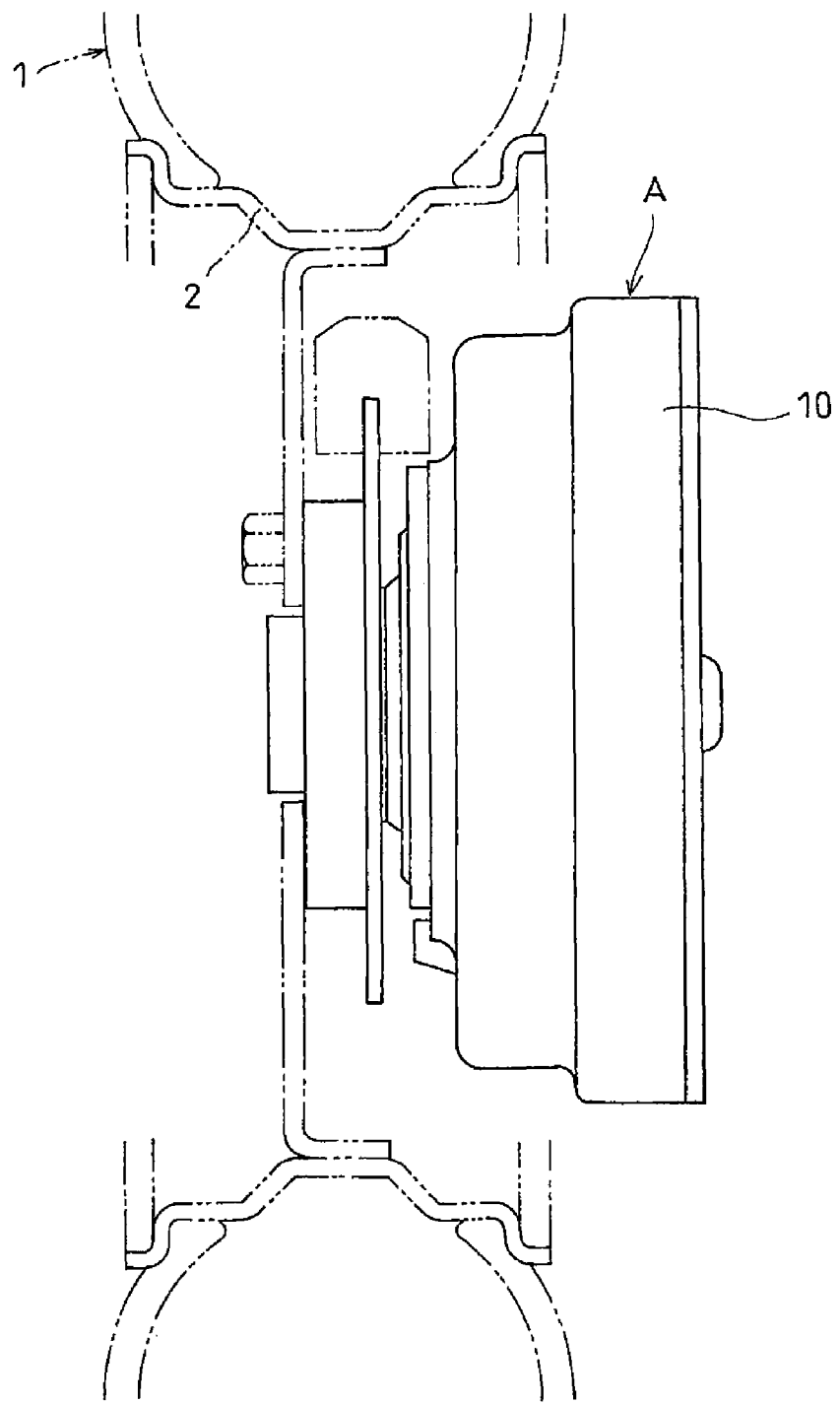
FIG. 2 is a front view of an in-wheel motor drive assembly embodying the present invention.

Now, the in-wheel motor drive assembly A embodying the present invention is described with reference to the drawings. As shown in FIG. 2, the in-wheel motor drive assembly A is mounted in the wheel body of a drive wheel 1.

Figure 3:
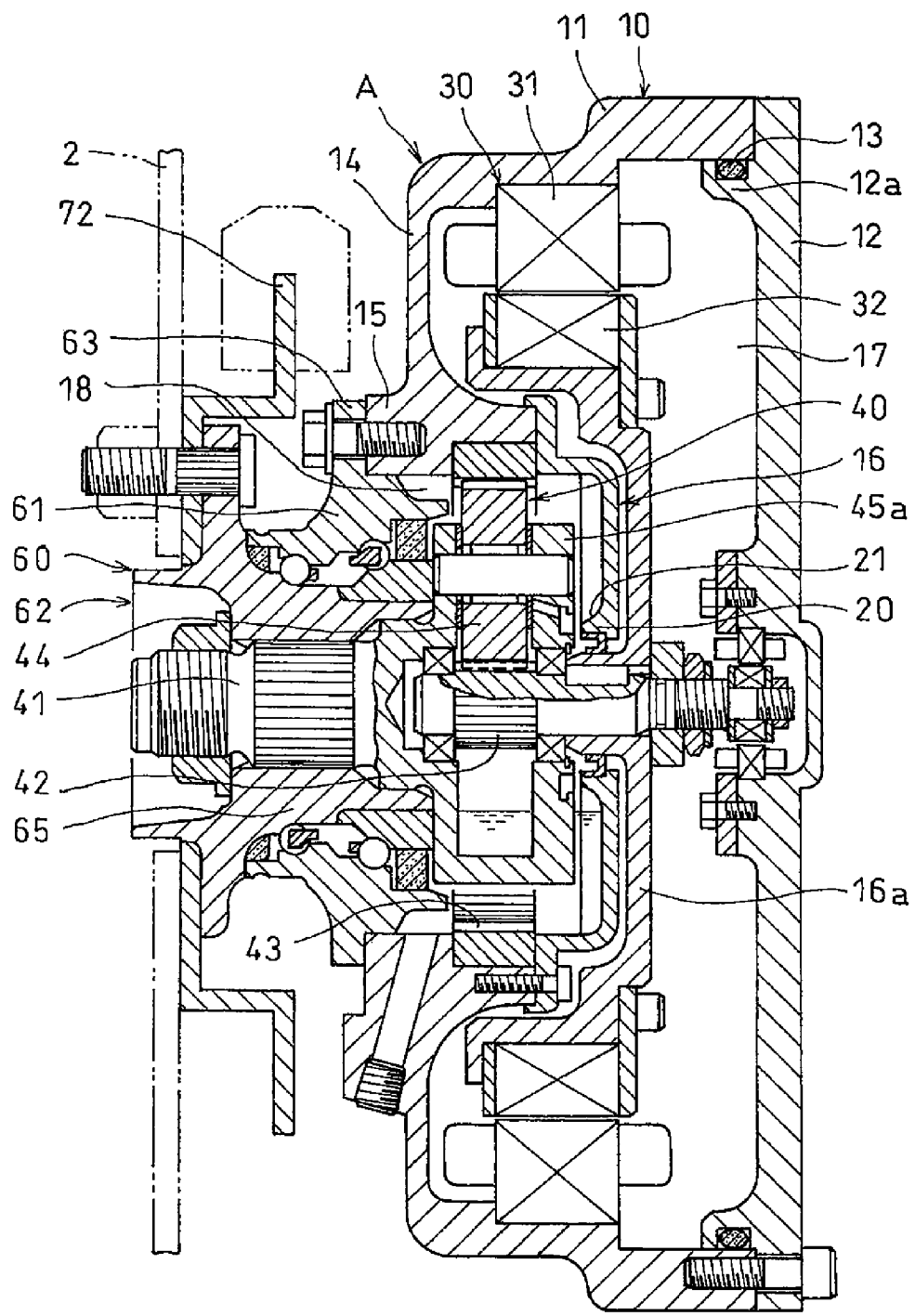
FIG. 3 is a vertical sectional view of the in-wheel motor drive assembly of FIG. 2.

As shown in FIG. 3, the in-wheel motor drive assembly A includes a motor case 10, an electric motor 30 mounted in the motor case 10, a reduction mechanism 40 for reducing the rotation of the electric motor 30 and outputting the thus reduced rotation, and a wheel bearing 60 rotatably supporting an output shaft 41 of the reduction mechanism 40.

The motor case 10 comprises a cylindrical case body 11 and a cover 12 closing an opening of the case body 11 at one end thereof. The cover 12 is formed with a cylindrical portion 12a fitted in the opening at one end of the case body 11. A seal ring 13 is mounted and seals between the fitting surfaces of cylindrical portion 12a and the case body 11.

The case body 11 has an annular end plate portion 14 at the other end. The end plate portion 14 is formed with a cylindrical portion 15 of which the inboard opening is closed by a partition wall 16. The partition wall 16 divides the interior of the motor case 10 into two chambers, i.e. a motor chamber 17 defined in the case body 11 and a reduction mechanism chamber 18 defined in the cylindrical portion 15.

Figure 4:
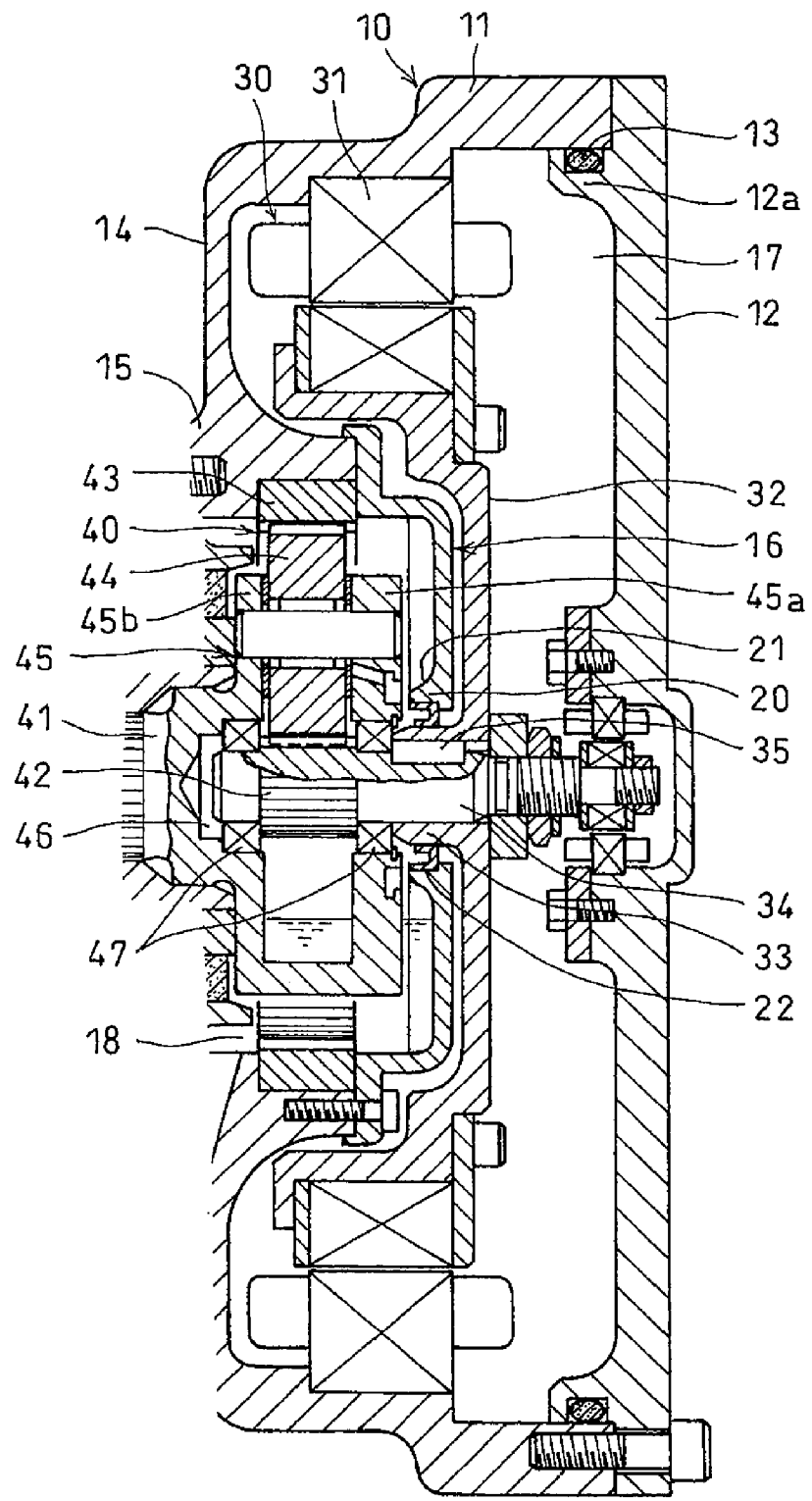
FIG. 4 is a sectional view showing an electric motor and a reduction mechanism of FIG. 3.
Figure 12:
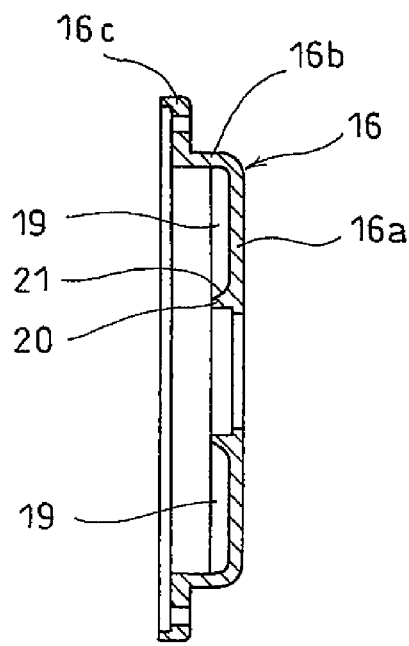
FIG. 12 is a sectional view of a partition wall of a motor case.
Figure 13:
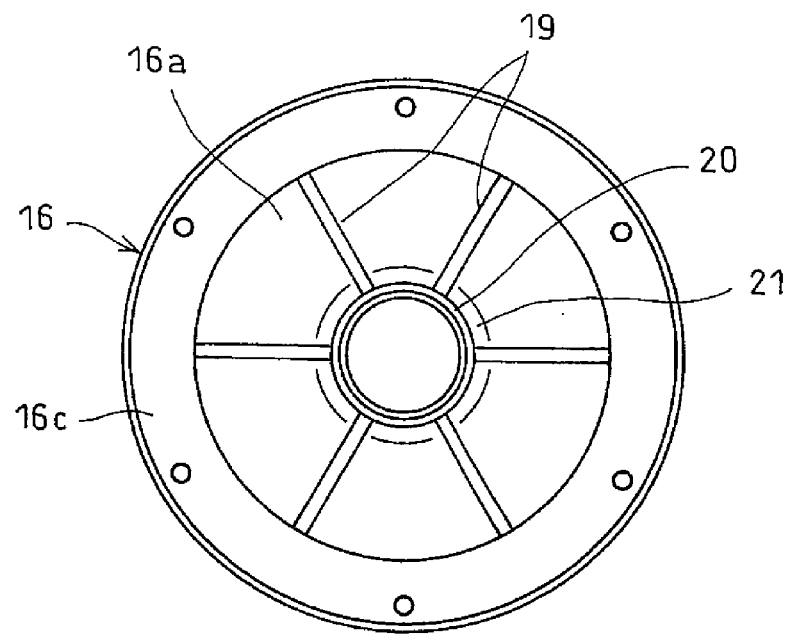
FIG. 13 is a left-hand side view of FIG. 12.

As shown in FIGS. 12 and 13, the partition wall 16 includes an end plate portion 16a, an outer tubular portion 16b provided at the outer edge of the end plate portion 16a, and a flange 16c extending outwardly from the open end of the outer tubular portion 16b. The partition wall 16 thus has the shape of a hat as a whole. As shown in FIG. 4, the flange 16c is in abutment with and screwed to the inboard end surface of the cylindrical portion 15.

Figure 6:
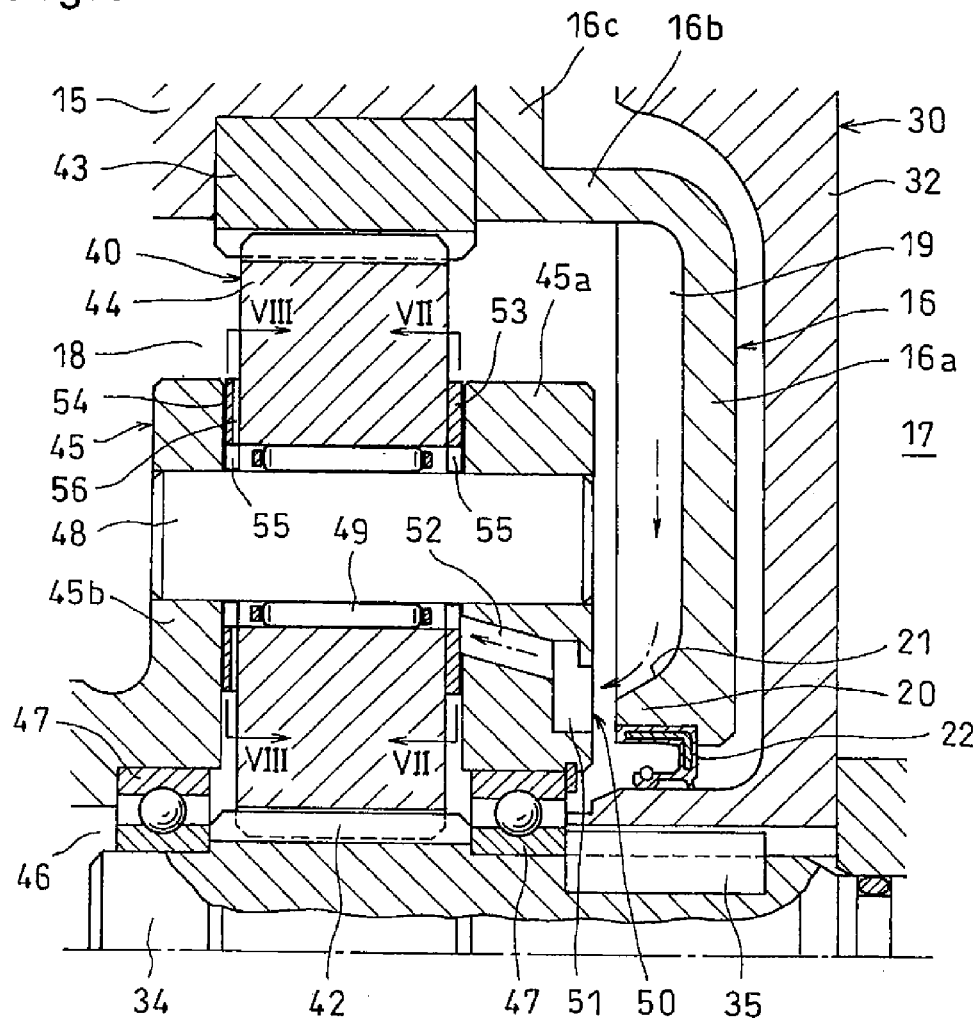
FIG. 6 is a partial enlarged sectional view of a planetary gear type reduction mechanism of FIG. 4.

The end plate portion 16a is reinforced by a plurality of radial ribs 19 formed on the inner surface thereof. An inner tubular portion 20 is formed on the inner surface of the end plate portion at its center. The inner tubular portion 20 has a tapered oil guide surface 21 on the outer periphery thereof. As shown in FIG. 6, the oil guide surface 21 is configured to guide lubricating oil which has been splashed up by the rotation of the reduction mechanism 40 mounted in the reduction mechanism chamber 18 and then flown down along the inner surface of the end plate portion 16a, toward the central area of the reduction mechanism chamber 18.

As shown in FIG. 4, the electric motor 30 includes a stator 31 fixed to the motor case 10, and a rotor 32 adapted to be rotated inside the stator 31 when the stator 31 is energized. The rotor 32 has a boss portion 33 at its center through which a rotor shaft 34 extends. The rotor shaft 34 is rotationally fixed to the rotor 32 by means of keys 35, so that the rotor shaft 34 rotates in unison with the rotor 32.

The boss portion 33 of the rotor 32 is inserted in the tubular portion 20 of the partition wall 16. A seal member 22 is mounted and seals between the fitting surfaces of the boss portion 33 and the tubular portion 20.

The reduction mechanism 40 for reducing the rotation of the rotor shaft 34 of the electric motor 30 is mounted in the reduction mechanism chamber 18, which is isolated from the motor chamber 17.

The reduction mechanism 40 is a planetary gear mechanism including a sun gear 42 mounted on an end of the rotor shaft 34, an internal gear 43 fixedly fitted in the radially inner surface of the cylindrical portion 15, and planetary gears 44 meshing with the internal teeth on the inner periphery of the internal gear 43 and the external teeth on the outer periphery of the sun gear 42. The planetary gears 44 are rotatably supported by a carrier 45 provided at the inboard end of the output shaft 41.

As shown in FIG. 4, the output shaft 41 is coaxial with the rotor shaft 34 and is formed with a shaft inserting hole 46 on the axis of the carrier 46 provided at the end of the output shaft 41. Two bearings 47 are mounted in the shaft inserting hole 46 and rotatably support the end of the rotor shaft 34.

As shown in FIG. 6, the carrier 45 includes an opposed pair of disk portions 45a and 45b sufficiently spaced apart from each other such that the planetary gears 44 can be received therebetween, and gear shafts 48 having their respective ends supported by the disk portions 45a and 45b and carrying bearings 49 in the form of needle roller bearings. The planetary gears 44 are rotatably supported on the respective gear shafts 48 through the bearings 49.

Of the opposed pair of disk portions 45a and 45b, the disk portion 45a, which faces the partition wall 16, is formed with an oil guide passage 50 through which lubricating oil that flows down along the oil guide surface 21 of the partition wall 16 toward the center of the reduction mechanism chamber 18 is partially guided toward the ends of the bearings 49.

The oil guide passage 50 includes an annular groove 51 formed in the inner peripheral portion of the outer surface of the disk portion 45a, which faces the partition wall 16, and inclined through-holes 52 each having one end thereof communicating with the annular groove 51 and extending toward the end surfaces of the respective bearings 49. The annular groove 51 has an L-shaped cross-section and serves as an oil reservoir.

Pairs of spacers 53 and 54 are disposed between the opposed surfaces of the respective planetary gears 44 and the disk portion 45a and between the opposed surfaces of the respective planetary gears 44 and the disk portion 45b, respectively. The spacers 53 and 54 are annular members, and mounted on the gear shafts 48 to support axial loads applied to the planetary gears 44.

Figure 7:
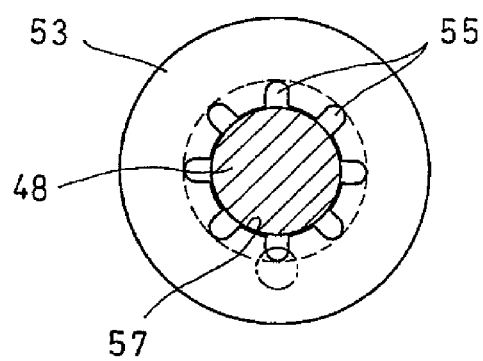
FIG. 7 is a sectional view taken along line VII-VII of FIG. 6.
Figure 8:
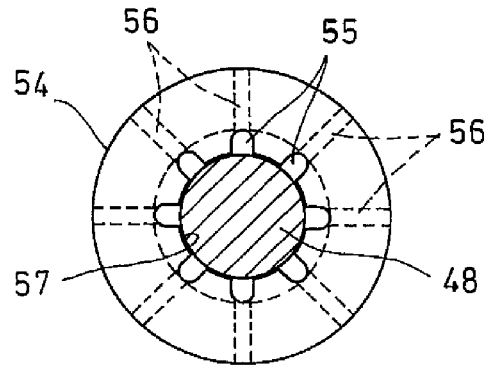
FIG. 8 is a sectional view taken along line VIII-VIII of FIG. 6.

As shown in FIGS. 6 to 8, each of the spacers 53 and 54 is formed with a shaft inserting hole 57 having circumferentially spaced apart cutouts 55 formed along the inner periphery of the hole 57. The spacers 54, which are disposed between the respective planetary gears 44 and the disk portion 45b, are each further formed with radial grooves 56 equal in number to the cutouts 55 and communicating with the respective cutouts 55, on the surface of the spacer 54 facing the corresponding planetary gear 44.

As shown in FIG. 3, the reduction mechanism chamber 18 is sealed by the partition wall 16, and the wheel bearing 60, which covers the opening of the inner tubular portion 20 at its outboard end. Lubricating oil is stored in the reduction mechanism chamber 18.

Lubricating oil is splashed up when the planetary gears 44 rotate about their own axes while simultaneously revolving around the axis of the reduction mechanism, thereby lubricating the meshing portions of the gears. Lubricating oil splashed up partially flows down along the inner surface of the partition wall 16.

Figure 5:
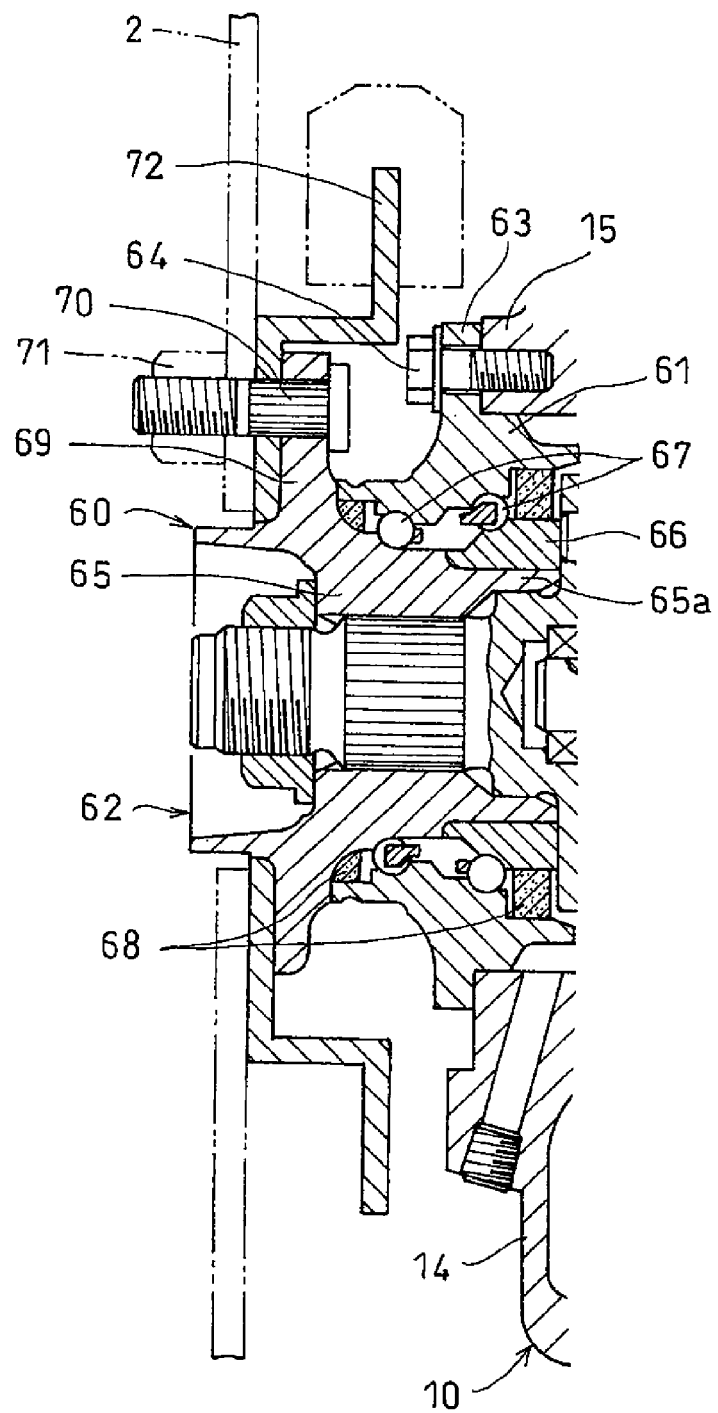
FIG. 5 is a sectional view showing a wheel bearing of FIG. 3.

As shown in FIG. 5, the wheel bearing 60 includes an outer bearing race 61 and an inner member 62 mounted inside the outer bearing race 61. The outer bearing race 61 is formed with a flange 63 on its radially outer surface which is to be mounted to the vehicle body. The flange 63 to be mounted to the vehicle body is mounted to the motor case 10 by bringing the flange 63 into abutment with the outboard end surface of the cylindrical portion 15 formed on the end plate portion 14 of the motor case 10, threading bolts 64 into the outboard end surface of the cylindrical portion 15, and tightening the bolts 64.

The inner member 62 includes a hub ring 65 and an inner bearing race 66 mounted on the inboard end of the hub ring 65 by being fitted on a small-diameter shaft portion 65a formed at the inboard end of the hub ring 65. The hub ring 65 and the inner bearing race 66 are rotatably supported, respectively, by first rolling elements 67 mounted between the hub ring 65 and the outer bearing race 61 and by second rolling elements 67 mounted between the inner bearing race 66 and the outer bearing race 61. Seal members 68 are mounted outside the first and second rolling elements 67, respectively, to close the respective end openings of the bearing space defined between the opposed portions of the outer bearing race 66 and the inner member 62.

A wheel mounting flange 69 is formed on the outer periphery of an outboard end portion of the hub ring 65 which is located outboard of the outboard end surface of the outer bearing race 61. The wheel mounting flange 69 carries a plurality of bolts 70 with nuts 71 in threaded engagement with the respective bolts 70. A brake rotor 72 and the wheel body 2 of the drive wheel 1 are mounted to the wheel mounting flange 69 by tightening the nuts 71.

The hub ring 65 is fitted to the end of the output shaft 41 by means of splines and thus rotates in unison with the output shaft 41.

In this arrangement, when the rotor 32 of the in-wheel motor drive assembly A is rotated by energizing the stator 31, the rotor shaft 34 rotates in unison with the rotor 32.

Since the rotor shaft 34 carries the sun gear 42, and the planetary gears 44 mesh with the sun gear 42 and the internal gear 43, which is fixed to the motor case 10, when the rotor shaft 34 rotates, the planetary gears 44 rotate about their respective axes while revolving around the axis of the rotor shaft 34. The rotation of the rotor shaft 34 is thus transmitted to the output shaft after being reduced in speed. Since the hub ring 65 is mounted on the output shaft 41 by means of serrations, the rotation of the output shaft 41 is transmitted to the hub ring 65 and then from the hub ring 65 to the drive wheel 1. The drive wheel 1 is thus driven.

While the planetary gears 44 of the planetary gear reduction mechanism 40 are rotating about their respective axes while revolving around the axis of the rotor shaft, lubricating oil is splashed up by the rotating planetary gears 44 and lubricates the meshing portions of the gears.

Lubricating oil splashed up by the rotating planetary gears 44 partially flows down along the inner surface of the partition wall 16, and through the gap defined between the distal end of the tapered oil guide surface 21 formed on the inner tubular portion 20 of the partition wall 16 and the disk portion 45a of the carrier 45, thereby lubricating one of the two bearings 47 rotatably supporting the rotor shaft 34.

Lubricating oil flowing down from the distal end of the oil guide surface 21 partially flows into the annular groove 51 of the oil guide passage 50. Since, in this state, the inclined through-holes 52, which communicate with the annular groove 51, are revolving around the rotor shaft 34, lubricating oil flowing into the annular groove 51 flows through the inclined through-holes 52 due to centrifugal force, and then flows through the cutouts 55 formed in the inner peripheries of the spacers 53 into the center holes of the planetary gears 44, thereby lubricating the bearings 49.

Lubricating oil that has flown into the center holes of the planetary gears 44 then flows through the other ends of the center holes into the cutouts 55 of the other spacers 54. Since the radial grooves 56 communicate with the cutouts 55, lubricating oil that has flown into the cutouts 55 flows down onto the radially outer surface of the rotor shaft 34 due to centrifugal force generated when the planetary gears 44 rotate about their respective axes, thereby lubricating one of the bearings 47 supporting the end of the rotor shaft 34.

Lubricating oil splashed up by the planetary gears 44 and then flowing down along the inner surface of the partition wall 16 is guided by the tapered oil guide surface 21 formed at the center of the inner surface of the partition wall 16, to the two bearings 47 supporting the rotor shaft 34 and the output shaft 41 so as to be rotatable relative to each other. As a result, both of the reduction mechanism 40 and the bearings 47 can be lubricated with oil. Moreover, since the reduction mechanism chamber 18, in which lubricating oil is stored, is isolated from the motor chamber 17, it is possible to lubricate the reduction mechanism 40 and the bearings 47 with oil without reducing the efficiency of the electric motor 30.

In the embodiment of FIG. 6, the spacers 53 and 54 are both rotatable relative to the planetary gears 44. But the spacers 53 and 54 may be fixed to the respective planetary gears 44 instead.

In FIGS. 7 and 8, the shaft inserting holes 57, in which the gear shafts 48 are inserted, are formed so that their center axes coincide with the centers of the radially outer surfaces of the respective spacers 53 and 54. But as shown in FIGS. 10 and 11, the shaft inserting holes 57 may be formed such that their center axes are offset from the centers of the radially outer surfaces of the respective spacers 53 and 54.

Figure 9:
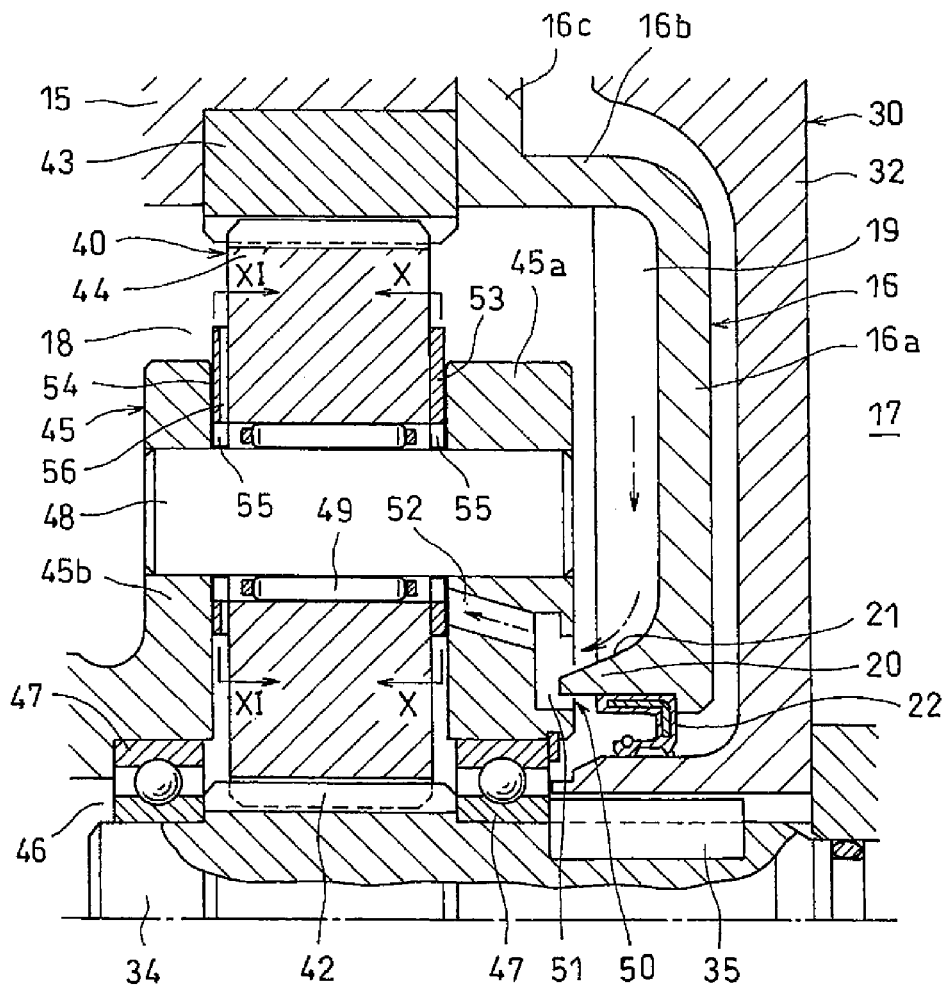
FIG. 9 is a sectional view of a different planetary gear type reduction mechanism.
Figure 10:
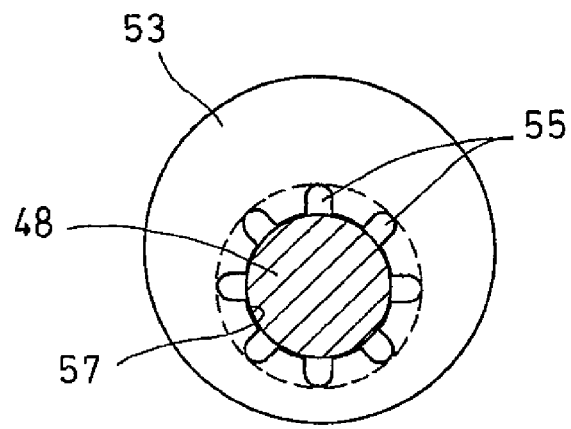
FIG. 10 is a sectional view taken along line X-X of FIG. 9.
Figure 11:
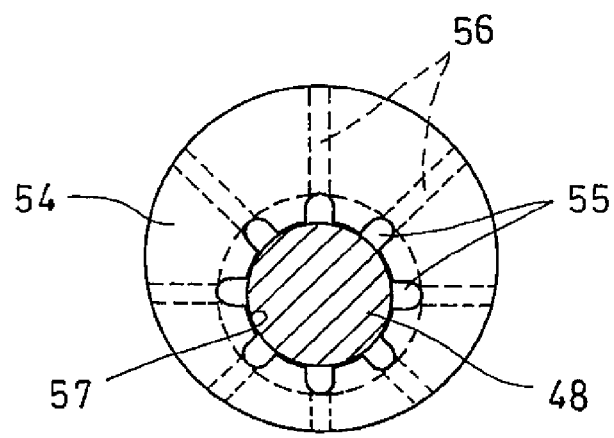
FIG. 11 is a sectional view taken along line XI-XI of FIG. 9.

FIG. 9 shows how the spacers 53 and 54 shown in FIGS. 10 and 11 are mounted on both sides of the respective planetary gears 44. In this case, the spacers 53 and 54 are mounted so as to be rotatable relative to the planetary gears 44.

Since the spacers 53 and 54 of FIGS. 10 and 11 have their shaft inserting holes 57 formed such that their axes are offset from the centers of the radially outer surfaces of the respective spacers, the point of the circumference of each spacer 53, 54 farthest from the axis of the shaft inserting hole 57 always faces radially outwardly due to centrifugal force during rotation. The cutouts 55 formed on the inner periphery of the shaft inserting hole 57 of each spacer are arranged such that, in the state of FIG. 9, one of the cutouts 55 always aligns with the oil guide passage 50. Thus, lubricating oil can be reliably fed through the cutouts 55.

As shown in FIG. 9, the small-diameter end of the oil guide surface 21 may protrude into the annular groove 51 of the oil guide passage 50 so that lubricating oil flowing down from the small-diameter end of the oil guide surface 21 can be reliably guided into the annular groove 51, thereby more reliably lubricating the bearings 49 and the one of bearings 47 supporting the end of the rotor shaft 34.

What is claimed is:

1. An in-wheel motor drive assembly comprising:
   a motor case having an end plate portion formed with a cylindrical portion and configured to be supported by a vehicle body;
   an electric motor including a stator fixedly mounted in the motor case, a rotor mounted in the stator, and a rotor shaft extending along a center axis of the rotor;
   a reduction mechanism for reducing a rotation of the rotor shaft of the electric motor and outputting a thus reduced rotation; and
   a hub ring for transmitting the reduced rotation outputted from the reduction mechanism to a drive wheel;
   wherein the reduction mechanism is a planetary gear mechanism comprising an output shaft arranged coaxial with the rotor shaft, a carrier provided at an end of the output shaft, planetary gears rotatably supported by the carrier, a sun gear mounted on the rotor shaft, and an internal gear fixedly fitted in an inner periphery of the cylindrical portion of the motor case, wherein the planetary gears are in meshing engagement with the sun ear and the internal gear, and wherein the reduction mechanism is configured such that when the sun gear rotates, the planetary gears rotate about axes of the respective planetary gears while revolving around the rotor shaft, thereby rotating the output shaft at a reduced speed,
   wherein a reduction mechanism chamber is provided outside a motor chamber defined in the motor case so as to be isolated from the motor chamber, wherein the reduction mechanism is mounted in the reduction mechanism chamber, wherein oil for lubricating the reduction mechanism is stored in the reduction mechanism chamber, wherein a partition wall between the motor chamber and the reduction mechanism chamber is formed with a tapered oil guide surface at a central portion of the partition wall, and wherein the tapered oil guide surface is configured to guide oil splashed up by the planetary gears and flowing down along an inner surface of the partition wall while the planetary gears are rotating and revolving, toward a bearing supporting the rotor shaft and the output shaft so as to be rotatable relative to each other, and wherein the carrier includes first and second opposed disk portions sufficiently spaced apart from each other such that the planetary gears can be received between the first and second disk portions, wherein the first disk portion faces the partition wall and is formed with an oil guide passage in an inner peripheral portion of the first disk portion such that oil flowing down along the inner surface of the partition wall partially flows through the oil guide passage and is supplied to bearings rotatably supporting the planetary gears.

2. The in-wheel motor drive assembly of claim 1, wherein the oil guide passage comprises an annular groove formed in an outer surface of the first disk portion facing the partition wall at the inner peripheral portion of the first disk portion, the annular groove having an L-shaped section, and through-holes communicating at ends of the respective through-holes with a radially outer edge of the annular groove, and extending toward end surfaces of the respective bearings rotatably supporting the planetary gears.

3. The in-wheel motor drive assembly of claim 2, wherein the oil guide surface has a small-diameter end located in the annular groove.

4. The in-wheel motor drive assembly of claim 1, wherein first annular spacers and second annular spacers are mounted between the first disk portion and the respective planetary gears and between the second disk portion and the respective planetary gears, respectively, such that axial loads applied to the planetary gears are supported by the first and second annular spacers.

5. The in-wheel motor drive assembly of claim 4, wherein each of the first and second annular spacers is formed with a shaft inserting hole through which a gear shaft is inserted, and wherein a plurality of cutouts are formed in an inner periphery of the shaft inserting hole so as to be circumferentially spaced apart from each other.

6. The in-wheel motor drive assembly of claim 5, wherein radial grooves are formed in a surface of each of the second spacers facing the corresponding planetary gear, the grooves being equal in number to the cutouts and communicating with the respective cutouts.

7. The in-wheel motor drive assembly of claim 4, wherein the first and second annular spacers are fixed to the corresponding planetary gears.

8. The in-wheel motor drive assembly of claim 5, wherein the shaft inserting holes of the first and second annular spacers have center axes offset from centers of radially outer surfaces of the respective spacers.

9. The in-wheel motor drive assembly of claim 4, wherein the first and second annular spacers are made of one of copper, brass and a resin.

10. The in-wheel motor drive assembly of claim 1, wherein radial ribs are formed on the inner surface of the partition wall.

* * * * *